(12) United States Patent
Wu et al.

(10) Patent No.: US 8,595,252 B2
(45) Date of Patent: Nov. 26, 2013

(54) SUGGESTING ALTERNATIVE QUERIES IN QUERY RESULTS

(75) Inventors: Jun Wu, Saratoga, CA (US); Tiejun Wang, Santa Clara, CA (US); Hayden Shaw, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 457 days.

(21) Appl. No.: 12/209,890

(22) Filed: Sep. 12, 2008

(65) Prior Publication Data

US 2009/0077037 A1    Mar. 19, 2009

Related U.S. Application Data

(60) Provisional application No. 60/972,723, filed on Sep. 14, 2007.

(51) Int. Cl.
G06F 7/00 (2006.01)
G06F 17/30 (2006.01)

(52) U.S. Cl.
USPC .......................................................... 707/765

(58) Field of Classification Search
USPC .................................. 707/706, 722, 726, 765
See application file for complete search history.

(56) References Cited

U.S. PATENT DOCUMENTS

| | | | | |
|---|---|---|---|---|
| 5,708,825 | A * | 1/1998 | Sotomayor | 715/205 |
| 6,516,312 | B1 * | 2/2003 | Kraft et al. | 707/610 |
| 6,671,681 | B1 | 12/2003 | Emens et al. | |
| 6,732,088 | B1 * | 5/2004 | Glance | 1/1 |
| 6,772,150 | B1 * | 8/2004 | Whitman et al. | 707/721 |
| 6,920,610 | B1 * | 7/2005 | Lawton et al. | 715/209 |
| 6,947,930 | B2 * | 9/2005 | Anick et al. | 1/1 |
| 7,194,454 | B2 * | 3/2007 | Hansen et al. | 1/1 |
| 7,249,121 | B1 * | 7/2007 | Bharat et al. | 1/1 |
| 7,287,025 | B2 * | 10/2007 | Wen et al. | 1/1 |
| 7,617,176 | B2 * | 11/2009 | Zeng et al. | 1/1 |
| 7,716,201 | B2 * | 5/2010 | Joshi | 707/706 |
| 7,747,611 | B1 * | 6/2010 | Milic-Frayling et al. | 707/722 |

(Continued)

FOREIGN PATENT DOCUMENTS

| | | |
|---|---|---|
| CN | 101027667 A | 8/2007 |
| WO | 2004/086192 | 10/2004 |

OTHER PUBLICATIONS

International Search Report and Written Opinion from corresponding International Patent Application No. PCT/US2008/076291 mailed Mar. 30, 2009, 12 pages.

(Continued)

*Primary Examiner* — Jeffrey A Burke
(74) *Attorney, Agent, or Firm* — Fish & Richardson P.C.

(57) ABSTRACT

Methods, systems, and apparatus, including computer program products, for suggesting alternative queries based on original query search results. In one aspect, a method includes receiving search results for a first query, where each search result refers to a respective resource and includes a snippet of content from the respective resource, receiving one or more suggested second queries, for each of the suggested second queries: selecting a set of words in one of the snippets to represent the suggested second query, associating the suggested second query with the set so that a user can interact with a word in the set to invoke the suggested second query, and marking the set so as to indicate that the user can interact with a word in the set to invoke the suggested second query, and transmitting the search results including each marked set to a client device for presentation to the user.

12 Claims, 6 Drawing Sheets

(56) References Cited

U.S. PATENT DOCUMENTS

| | | | |
|---|---|---|---|
| 7,747,639 B2* | 6/2010 | Kasperski et al. | 707/765 |
| 7,752,204 B2* | 7/2010 | Kao et al. | 707/736 |
| 8,244,749 B1* | 8/2012 | Das et al. | 707/765 |
| 8,312,014 B2* | 11/2012 | Lu et al. | 707/732 |
| 2002/0057285 A1* | 5/2002 | Nicholas, III | 345/700 |
| 2004/0199498 A1* | 10/2004 | Kapur et al. | 707/3 |
| 2005/0091186 A1* | 4/2005 | Elish | 707/1 |
| 2006/0161520 A1 | 7/2006 | Brewer et al. | |
| 2006/0230005 A1* | 10/2006 | Bailey et al. | 706/12 |
| 2006/0282416 A1* | 12/2006 | Gross et al. | 707/3 |
| 2007/0050351 A1* | 3/2007 | Kasperski et al. | 707/4 |
| 2007/0271255 A1* | 11/2007 | Pappo | 707/5 |
| 2008/0235209 A1* | 9/2008 | Rathod et al. | 707/5 |
| 2008/0270380 A1* | 10/2008 | Ohrn et al. | 707/5 |
| 2009/0198667 A1* | 8/2009 | Groeneveld et al. | 707/5 |
| 2010/0228710 A1* | 9/2010 | Imig et al. | 707/706 |
| 2011/0225145 A1* | 9/2011 | Greene et al. | 707/722 |

OTHER PUBLICATIONS

Office Action dated Feb. 21, 2012 from related Chinese Application No. 200880114226.7, 4 pages.

Office Action dated Jan. 15, 2013 from related Chinese Application No. 200880114226.7, 6 pages.

* cited by examiner

SUGGESTING ALTERNATIVE QUERIES IN QUERY RESULTS

CROSS-REFERENCE TO RELATED APPLICATION

This application claims the benefit under 35 U.S.C. §119 (e) of U.S. patent application Ser. No. 60/972,723, filed Sep. 14, 2007, which is incorporated by reference herein in its entirety.

BACKGROUND

This specification relates to suggesting alternative queries to users submitting queries to internet search engines.

Internet search engines aim to identify resources (e.g., web pages, images, text documents, multimedia context) that are relevant to a user's needs and to present information about the resources in a manner that is most useful to the user. Internet search engines return a set of search results in response to a user-submitted query. Unfortunately, the terms of a user-submitted query may not align well with what the user has in mind, for example, if there is ambiguity in the meaning of the query terms. Even if the search results returned are relevant objectively to the user-submitted query, the results may not be relevant to the user's actual subjective needs. If a user is dissatisfied with the search results returned for a query, the user can attempt to refine the original query to better match the user's needs.

Some search engines provide to a user suggested alternative queries that the search engine identifies as being related to the user's original query. Often, these suggested alternative queries are presented in proximity to the original query search results (e.g., at the bottom of a web page of search results). However, due to limited availability of space on search results web pages, the number of suggested alternative queries which can be displayed may be limited. Moreover, the relationship between the original query and the suggested alternative queries may not be apparent to a user, which may discourage the user from selecting any of the suggested alternative queries.

SUMMARY

This specification describes technologies relating to suggesting alternative queries based on original query search results.

In general, one aspect of the subject matter described in this specification can be embodied in methods that include the actions of receiving a set of one or more search results for a first query, where each search result refers to a respective resource and includes a link to the respective resource and a snippet of content from the respective resource, receiving one or more suggested second queries, for each of the one or more suggested second queries: selecting a set of one or more words in one of the snippets to represent the suggested second query, associating the suggested second query with the set of one or more words in the snippet so that a user can interact with a word in the set of one or more words in the snippet to invoke the suggested second query, and marking the set of one or more words in the snippet so as to indicate that the user can interact with a word in the set of one or more words in the snippet to invoke the suggested second query, and transmitting the set of search results including each marked set of one or more words to a client device for presentation to the user. Other embodiments of this aspect include corresponding systems and computer program products. The system includes a client device and one or more computers operable to interact with the client device and to perform the above listed actions.

These and other embodiments can optionally include one or more of the following features. Marking the set of one or more words can include one or more of underlining, highlighting, italicizing, or displaying the set of one or more words in bold font. The suggested second query can differ from the set of one or more words in the snippet. For the system, the one or more computers can include a server operable to interact with the client device through a data communication network, and the client device can be operable to interact with the server as a client. The client device can include a personal computer running a web browser or a mobile telephone running a wireless application protocol (WAP) browser. The one or more computers can include one personal computer, and the personal computer can include the client device.

In general, in one aspect, a method is provided. The method includes displaying on a display device a first set of one or more search results for a first query, each search result referring to a respective resource and including a link to the respective resource and a snippet of content from the respective resource, where a each of one or more suggested second query queries is associated with a respective set of one or more words in one of the snippets so that a user can interact with a word in the respective set of one or more words in the respective snippet to invoke the associated suggested second query, for a particular suggested second query: receiving input from the user interacting with a word in the respective set of one or more words in the respective snippet to invoke the particular suggested second query, and submitting the particular suggested second query to a search engine, and displaying a second set of one or more search results received from the search engine for the particular suggested second query. Other embodiments of this aspect include computer program products.

These and other embodiments can optionally include one or more of the following features. Receiving input from the user can further include receiving input from the user moving a cursor displayed on the display device, determining whether the cursor is positioned within a region associated with a word in the respective set of one or more words, and while the cursor is positioned within a region associated with a word in the respective set of one or more words, displaying a dialog box including the particular suggested second query, and receiving input from the user selecting the particular suggested second query included in the dialog box. While the cursor is positioned within the region associated with the word in the respective set of one or more words, an appearance of the respective set of one or more words in the snippet can be changed.

In general, one aspect of the subject matter described in this specification can be embodied in methods that include the actions of displaying on a display device a first set of one or more search results for a first query, each search result referring to a respective resource and including a link to the respective resource, and one or more suggested second queries associated with the first set of one or more search results, each of the one or more suggested second queries being selectable; for a particular suggested second query: receiving input from the user selecting the particular suggested second query; and submitting the particular suggested second query to a search engine and displaying a second set of one or more search results received from the search engine for the particular suggested second query. Other embodiments of this aspect include corresponding systems and computer program products.

Particular embodiments of the subject matter described in this specification can be implemented to realize one or more of the following advantages. A large number of suggested alternative queries can be displayed with original query search results by associating the suggested alternative queries with sets of one or more words in snippets of content in original query search results. The relationship between the original query and each suggested alternative query is easy to understand when the suggested alternative queries are associated with sets of one or more words in snippets. Suggested alternative queries can be especially useful for users submitting queries in non-Roman-based languages, e.g., Chinese, because entering a query in a non-Roman-based language can take longer than entering the same query in a Roman-based language.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
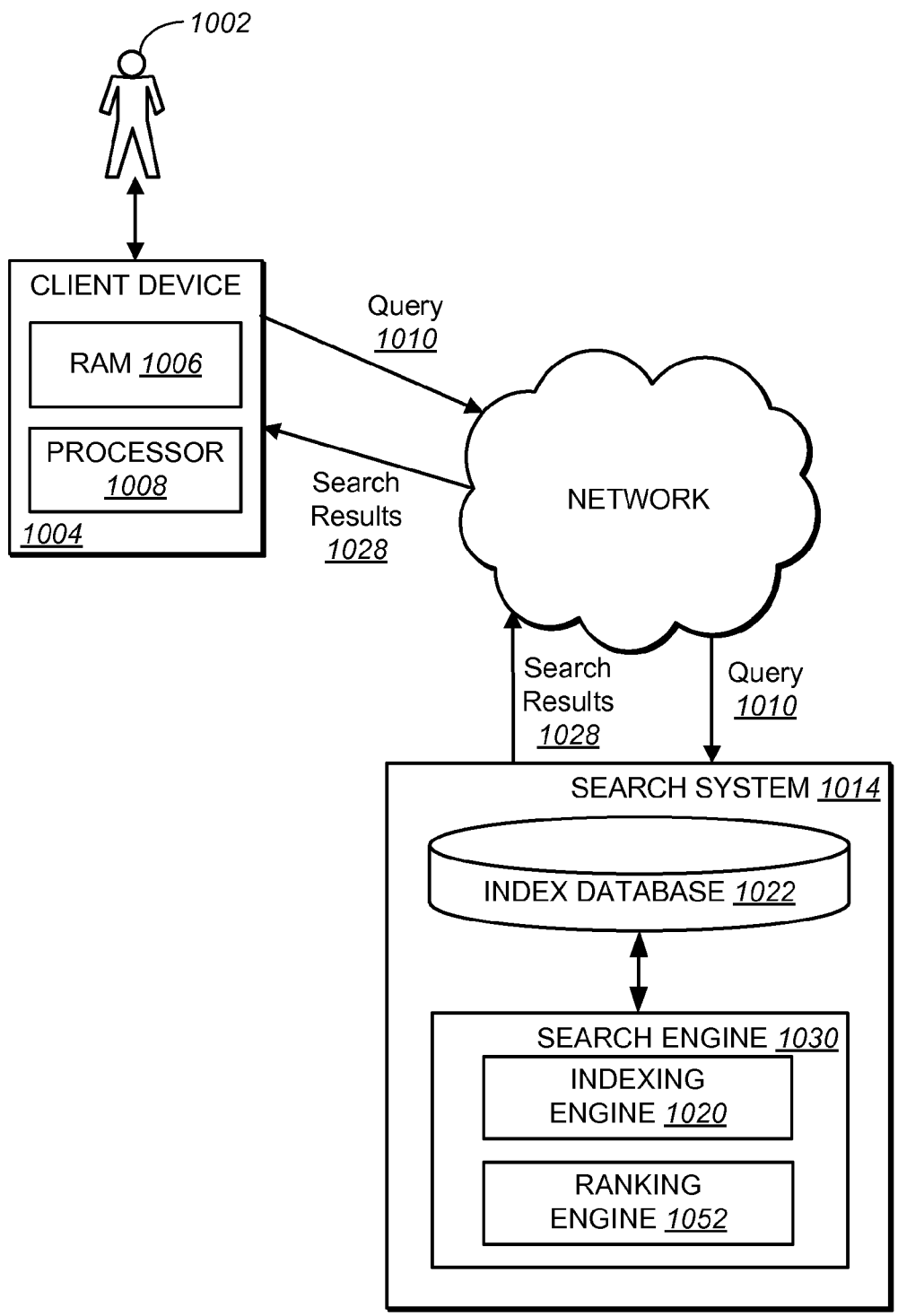
FIG. 1 shows an example search system.

FIG. 1 shows an example search system 1014 for providing search results relevant to submitted queries as can be implemented in an internet, an intranet, or another client and server environment. The search system 1014 is an example of an information retrieval system in which the systems, components, and techniques described below can be implemented.

A user 1002 can interact with the search system 1014 through a client device 1004. For example, the client 1004 can be a computer coupled to the search system 1014 through a local area network (LAN) or wide area network (WAN), e.g., the Internet. In some implementations, the search system 1014 and the client device 1004 can be one machine. For example, a user can install a desktop search application on the client device 1004. The client device 1004 will generally include a random access memory (RAM) 1006 and a processor 1008.

A user 1002 can submit a query 1010 to a search engine 1030 within a search system 1014. When the user 1002 submits a query 1010, the query 1010 is transmitted through a network to the search system 1014. The search system 1014 can be implemented as, for example, computer programs running on one or more computers in one or more locations that are coupled to each other through a network. The search system 1014 includes an index database 1022 and a search engine 1030. The search system 1014 responds to the query 1010 by generating search results 1028, which are transmitted through the network to the client device 1004 in a form that can be presented to the user 1002 (e.g., as a search results web page to be displayed in a web browser running on the client device 1004).

When the query 1010 is received by the search engine 1030, the search engine 1030 identifies resources that match the query 1010. The search engine 1030 will generally include an indexing engine 1020 that indexes resources (e.g., web pages, images, or news articles on the Internet) found in a corpus (e.g., a collection or repository of content), an index database 1022 that stores the index information, and a ranking engine 1052 (or other software) to rank the resources that match the query 1010. The indexing and ranking of the resources can be performed using conventional techniques. The search engine 1030 can transmit the search results 1028 through the network to the client device 1004 for presentation to the user 1002.

Figure 2:
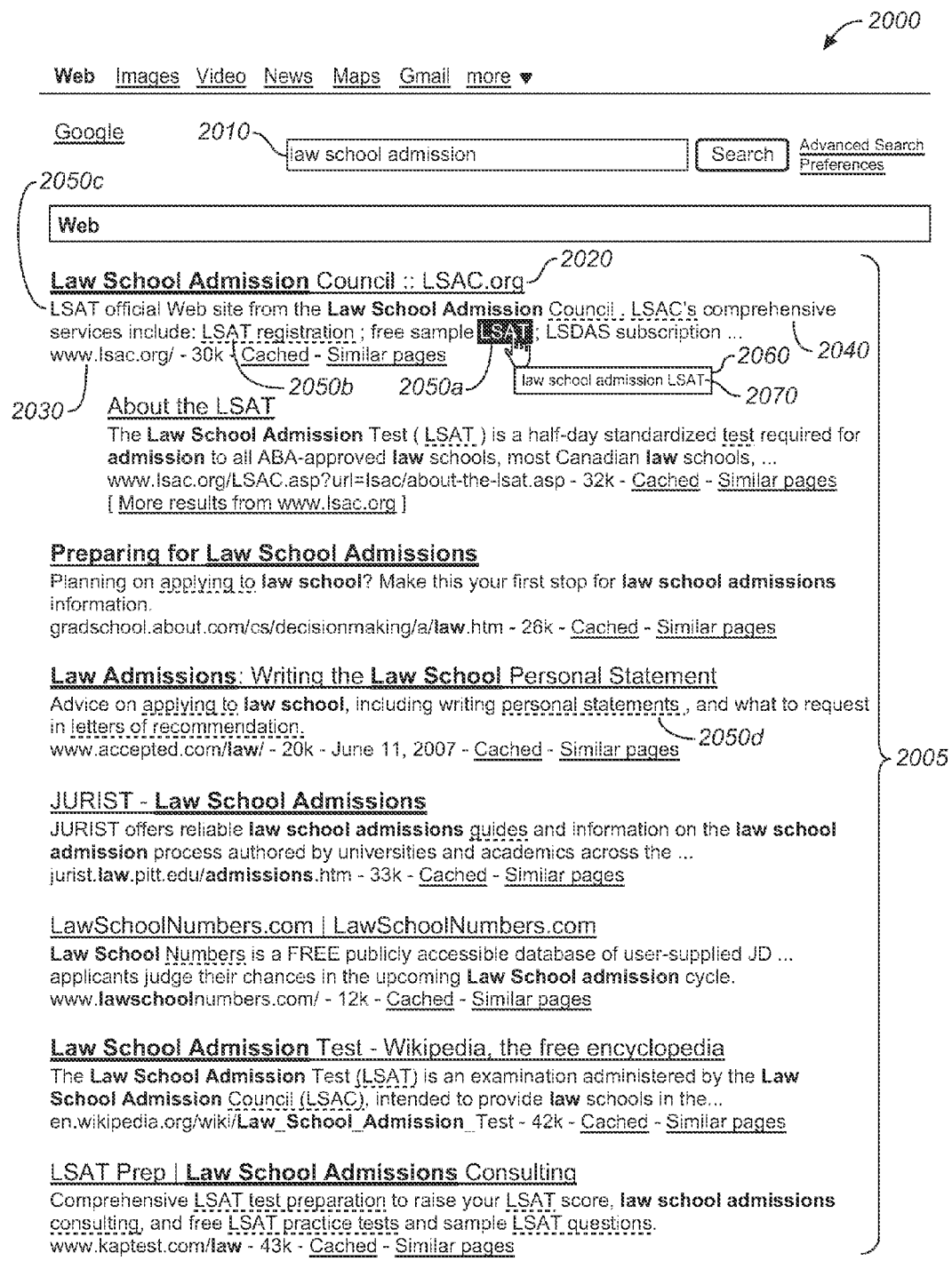
FIG. 2 illustrates an example web page of search results including a suggested alternative query.

FIG. 2 illustrates an example web page 2000 of search results 2005 including a suggested alternative query 2070. The web page 2000 includes an original query 2010, "law school admission," and a set of search results 2005 returned from a search engine 1030 in response to the original query 2010. A search result can include, for each of a number of resources, a title 2020 for the resource, a selectable link 2030 to the resource, and a snippet 2040 of content from the resource. Generally, a snippet 2040 of content includes one or more words, phrases, clauses, or sentences extracted from the textual content of the resource. A phrase is a meaningful sequence of two or more words. The search engine 1030 extracts a contiguous segment or separated segments of textual content from the resource to form a snippet 2040. The search engine 1030 optionally marks the terms of the original query 2010 (i.e., "law," "school," and "admission" in the example) in bold font when the query terms appear in the snippets.

The search system 1014 can provide to the user one or more suggested alternative queries for the original query 2010. In typical search systems, the suggested alternative queries are presented in proximity to the original query search results (e.g., at the bottom of a web page of search results). The search engine 1030 of the search system 1014 can transmit to a client device 1004 instructions for presenting the suggested alternative queries to the user. These instructions can be included with the search results 2005 that match the original query 2010. Particular techniques for generating the suggested alternative queries are described below.

For each suggested alternative query, the search system 1014 selects a set of one or more words in one of the snippets to represent the suggested alternative query. The search system 1014 associates the suggested alternative query with the set of one or more words in the snippet and marks the set in the snippet to indicate that a user can interact with a word in the set in the snippet to invoke the suggested alternative query associated with the set.

The search system 1014 can associate the suggested alternative query with the set of one or more words in the snippet by defining the set as a query element of the web page 2000, where user selection of the query element triggers the web browser to display the suggested alternative query. Alternatively, if the words in the set are not contiguous in the snippet, each word in the set can be defined as a query element. The system 1014 can generate one or more client-side scripts (e.g., using JavaScript) to define the sets or words as query elements. Query elements are regions in a hypertext document (e.g., web page 2000) that when selected trigger one or more actions. A client-side script can include instructions for performing the one or more actions triggered by a selection. A client-side script can be embedded within the hypertext document and executed by the web browser on the client device 1004.

In some implementations, when a user selects a query element, the web browser displays a dialog box that includes the suggested alternative query. In other implementations, the query element is a hyperlink, e.g., with a Uniform Resource Locator (URL) link, to submit the suggested alternative query to the search engine 1030. If a user selects the hyperlink, the web browser submits the suggested alternative query, in response to which the search engine 1030 generates new search results for the suggested alternative query.

Figure 3:
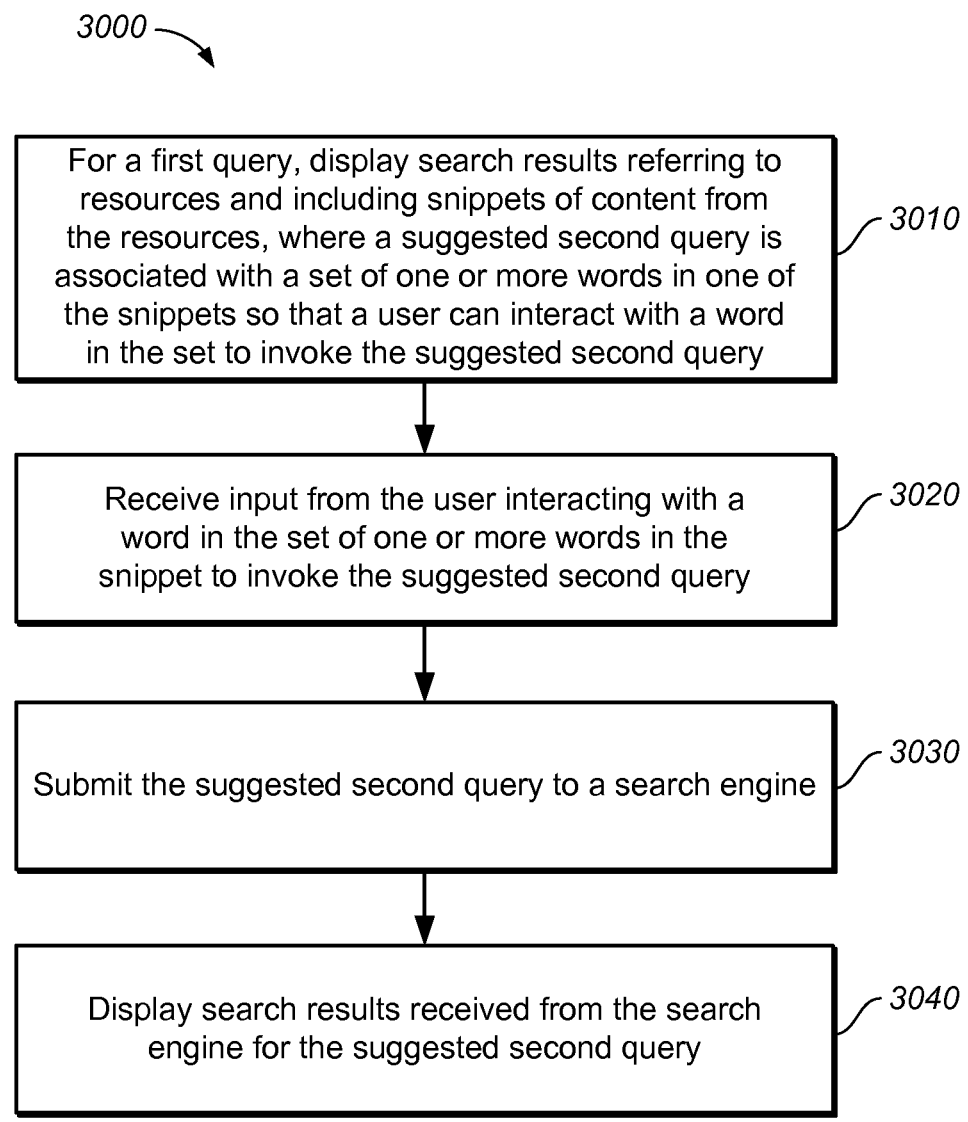
FIG. 3 shows an example process for invoking a suggested alternative query associated with one or more words in a snippet of content.

FIG. 3 shows an example process 3000 for invoking a suggested alternative query associated with one or more words in a snippet of content. For convenience, the example process 3000 will be described with reference to FIG. 2 and a system that performs the process 3000.

For a first query, the system displays a first set of one or more search results, where each search result refers to a respective resource and includes a link to the respective resource and a snippet of content from the respective resource, and a suggested second query is associated with a set of one or more words in one of the snippets so that a user can interact with a word in the set to invoke the suggested second query (step 3010). The system can display the first set of one or more search results on a display device of a client device 1004. The first query can be an original query submitted by a user, and the suggested second query can be a refined or alternative query.

In the example of FIG. 2, sets 2050a, 2050b, 2050c, and 2050d of one or more words in the snippets are emphasized when the web browser displays the web page 2000. The web browser displays the sets 2050a, 2050b, 2050c, and 2050d in a way that distinguishes the appearance of the words in the sets from the appearance of other words in the snippets (including query terms), indicating that a user can interact with words in the sets. The sets 2050a, 2050b, 2050c, and 2050d are emphasized using dashed underlining. Other ways of emphasizing the sets 2050a, 2050b, 2050c, and 2050d include solid underlining, highlighting, and italicizing. In some implementations, a set is emphasized in the display when the set is marked as an anchor for a hyperlink.

The system receives input from the user interacting with a word in the set of one or more words in the snippet to invoke the suggested second query (step 3020). In some implementations, a user interacts with a word in the set by moving a cursor displayed on the display device over the word in the set. For example, a web browser can receive the user input and determine whether the user positioned a cursor within a region associated with a word in the set. The user can position the cursor within a region by manipulating an input device (e.g., a mouse or a trackball). If the web browser determines that the cursor is positioned within a region associated with a word in the set, the web browser can display the suggested second query (e.g., in a dialog box). The user can select the displayed suggested second query, and the web browser can receive the selection as user input.

In the example of FIG. 2, a user has interacted with a word, "LSAT," in the set 2050a by positioning a cursor over the query element associated with the word or the set 2050a in the user interface. The user interaction with the set 2050a triggers the web browser to display a dialog box 2060 which includes the suggested alternative query 2070 (i.e., "law school admission LSAT") that the search engine 1030 associated with the set 2050a. The suggested alternative query 2070 displayed in the dialog box 2060 can have an embedded hyperlink to a web page for the search system 1014.

In some implementations, the search system 1014 associates multiple suggested second queries with the same set of one or more words in the snippet. When a user positions the cursor within a region associated with a word in the set, the web browser displays a dialog box which includes a list of all the suggested second queries associated with the set. The user can select the desired second query from the list.

In some implementations, when the system determines that the cursor is positioned within a region associated with a word in the set of one or more words in the snippet, the system changes the appearance of the emphasized set, for example, to indicate to the user that the displayed dialog box and included suggested second query are associated with the set. In the example of FIG. 2, the display of the dashed underlined set 2050a, "LSAT," has already changed to a display of the set 2050a in bold font with a shaded or colored background.

In some implementations, when a user positions a cursor over a query element of a word in the emphasized set, the web browser changes the appearance of the cursor (e.g., from an arrow to a hand). In some implementations, when a user positions a cursor over text with an embedded hyperlink, the client device 1004 displays in a status bar of a web browser the URL of the embedded hyperlink. For example, if the user hovers over (i.e., positions the cursor over) a suggested second query with an embedded hyperlink, the web browser can display in a status bar the embedded hyperlink URL with the suggested second query appended to the URL.

After the system receives input from the user selecting the suggested second query, the system submits to a search engine 1030 the suggested second query (step 3030). The search engine 1030 processes the suggested second query. The system displays a second set of one or more search results received from the search engine 1030 for the suggested second query (3040). The search engine 1030 returns the search results for the suggested second query as it would for any other query. That is, without explicitly entering a new query into a search text field of the web page 2000 of FIG. 2, a user can receive a set of search results for the suggested alternative query 2070 by simply selecting the suggested alternative query 2070 displayed in the dialog box 2060.

In one scenario, instead of a dialog box including the suggested second query, the dialog box includes a navigational query that refers to a particular resource. In some implementations, the search system 1014 can identify a query as a navigational query and include instructions (e.g., as a client-side script) for the client device 1004 to redirect the user to the web page for the particular resource referred to by the navigational query when a user selects the navigational query. For example, if a user interacts with the set 2050b of FIG. 2, "LSAT registration," the client device 1004 can display a dialog box which includes a navigational query "register for the LSAT." If the user selects the navigational query, the client device 1004 might redirect the user (e.g., using a hyperlink embedded in the text of the navigational query) to the Law School Admission Council web page for online LSAT registration, rather than presenting a web page of search results that includes references to resources that match the query "LSAT registration."

In some scenarios, the second set of search results for the second query includes one or more search results from the first set of search results for the first query. In some implementations, when the web browser submits the second query, the search engine 1030 generates new search results that match both the first query and the second query. In some implementations, the search engine 1030 associates one or more suggested third queries with sets of words in snippets included with the second set of search results for the second query.

Figure 4:
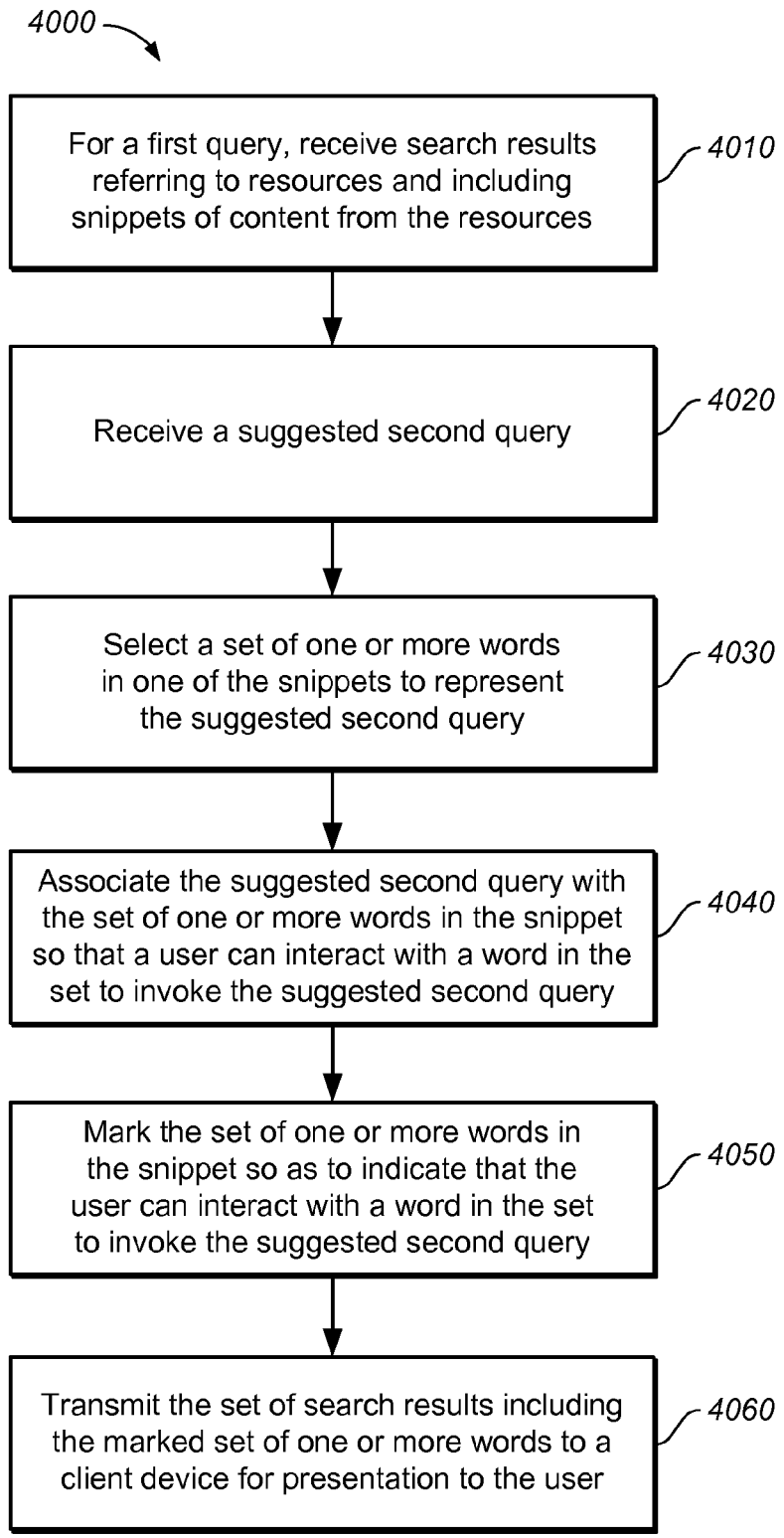
FIG. 4 shows an example process for associating a suggested alternative query with one or more words in a snippet of content.

FIG. 4 shows an example process 4000 for associating a suggested alternative query with one or more words in a snippet of content. For convenience, the example process 4000 will be described with reference to a system that performs the process 4000.

For a first query (e.g., an original query submitted by a user), the system receives a set of one or more search results, where each search result refers to a respective resource and includes a link to the respective resource and a snippet of content from the respective resource (step 4010). The system also receives a suggested second query (e.g., a refined or alternative query) (step 4020). In some implementations, the system can receive multiple suggested second queries. Alternatively, in some implementations, the system generates the one or more suggested second queries using the received one or more search results.

The system selects a set of one or more words in one of the snippets to represent the suggested second query (step 4030). For example, the system can select the shortest sequence of words in the snippet that includes all or most of the terms in the suggested second query. Alternatively, if the suggested second query is an extension of the first query by one or more additional terms, the system can select one or more words in the snippet that includes the one or more additional terms. In some implementations, the system changes the content of a snippet based on the suggested second query. For example, the system can extract from the respective resource a different segment of textual content (e.g., a segment that includes all the terms in the suggested second query) to form the snippet.

Generally, the suggested second query differs from the selected set of one or more words in the snippet. For example, the suggested second query can have one or more words which differ from the one or more words of the selected set or one or more words that are not found in the selected set. In some implementations, the system predetermines possible replacement or additional words for a first query based on aggregated statistics of follow-on queries made in previous sessions by multiple users after entering the first query. In other implementations, the documents retrieved by the system are used to determine the second query as a word or phrase that appears frequently in the text of these retrieved documents, their titles, or in hyperlink text that points to these documents.

In some scenarios, the selected set of one or more words in the snippet is the same as the suggested second query. In some implementations, the system selects two identical sets (e.g., sets 2050a and 2050c of FIG. 2) to represent the same suggested second query. Alternatively, the system can select two identical sets (e.g., sets 2050a and 2050c) to represent different suggested second queries. For example, the system can select the set 2050c, "LSAT," to represent a suggested second query "law school admission exam," which differs from the suggested second query 2070 represented by the set 2050a.

The system associates the suggested second query with the selected set of one or more words in the snippet so that a user can interact with a word in the set of one or more words in the snippet to invoke the suggested second query (step 4040). In some implementations, the system associates multiple suggested second queries with the same set of one or more words in the snippet. As previously described, user interaction with a word in the set can invoke presentation of the multiple suggested second queries for user selection.

The system marks the set of one or more words in the snippet so as to indicate that the user can interact with a word in the set in the snippet to invoke the suggested second query (step 4050). The system transmits the set of search results including the marked set of one or more words to a client device 1004 for presentation to the user (step 4060). The client device 1004 can present the search results to a user, for example, as a web page 2000 displayed in a web browser running on the client device 1004.

In some implementations, a suggested second query is generated by replacing one or more terms in the first query with one or more different terms. For example, the system can replace a term in the first query with another term according to a similarity measure between the two terms. The system can identify candidate replacement terms from words in the snippets or words in the resources (e.g., within 30 words of the first query terms in the resources). Once a candidate replacement term is identified, the system can determine the similarity measure between the two terms using, for example, a semantic word clustering database (e.g., a lexical database of words grouped into sets of cognitive synonyms, where each set is a distinct concept).

In other implementations, a suggested second query is generated by replacing a sequence of terms in the first query with another sequence of terms, where one sequence is a substring of the other sequence. For example, the system can select the replacement sequence of terms from a set of possible replacement sequences by comparing frequency values of the possible replacement sequences. The system can compute the frequency values based on, for example, counts of the number of documents that match the first query in which the possible replacement sequences occur. The system can predetermine possible replacement sequences for a given query using query logs and documents that match the given query.

In some implementations, multiple suggested second queries are generated. For example, the system can generate multiple suggested second queries and select a subset of the suggested second queries according to a predetermined criterion, e.g., one that compares computed likelihoods of the suggested second queries. The selected suggested second queries can be the suggested second queries with the highest likelihoods or with likelihoods above a predetermined threshold.

Figure 5:
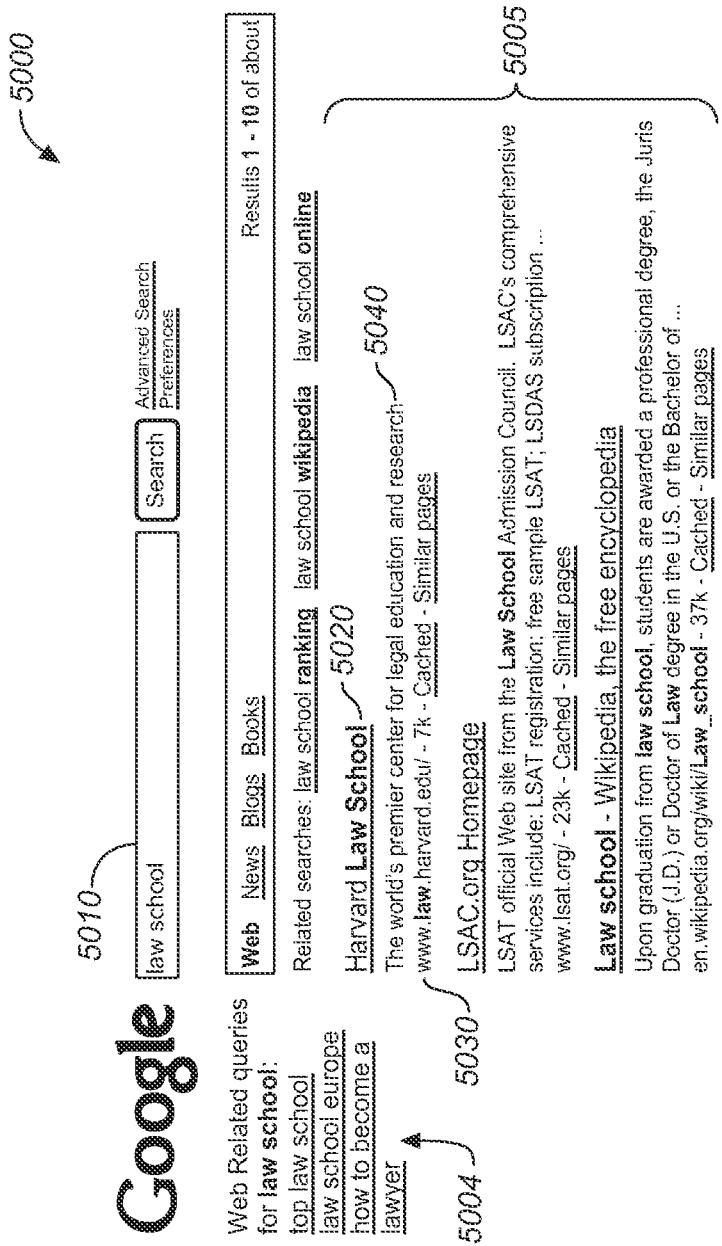
FIG. 5 illustrates an example portion of a web page of search results including a suggested alternative queries.

FIG. 5 illustrates an example portion of a web page 5000 of search results 5002 including a suggested alternative queries 5004. The web page 5000 includes an original query 5010, "law school," and a set of search results 5005 returned from a search engine (e.g., search engine 1030) in response to the original query 5010.

A search result can include, for each of a number of resources, a title 5020 for the resource, a selectable link 5030 to the resource, and a snippet 5040 of content from the resource. Generally, a snippet 5040 of content includes one or more words, phrases, clauses, or sentences extracted from the textual content of the resource. A phrase is a meaningful sequence of two or more words. The search engine 1030 extracts a contiguous segment or separated segments of textual content from the resource to form a snippet 5040. The search engine 1030 optionally marks the terms of the original query 5010 (i.e., "law" and "school" in the example) in bold font when the query terms appear in the snippets.

The search system 1014 can provide to the user one or more suggested alternative queries 5004 for the original query 5010. In particular, the suggested alternative queries 5004 are presented in proximity to the original query search results (e.g., on a web page of search results to the left of the search results listing). The search engine 1030 of the search system 1014 can transmit to a client device 1004 instructions for presenting the suggested alternative queries 5004 to the user.

These instructions can be included with the search results 5005 that match the original query 5010.

Particular techniques for generating the suggested alternative queries have been described above, for example, using snippets or other content information from the search results 5005 or their associated resources. For example, the suggested alternative queries 5004 can include text taken directly from the snippet texts. Alternatively, in another example, the suggested alternative queries 5004 can include queries derived from the snippet texts.

When a user selects a particular suggested alternative query of the suggested alternative queries 5004, the web browser submits the suggested alternative query, in response to which the search engine 1030 generates new search results for the suggested alternative query.

Figure 6:
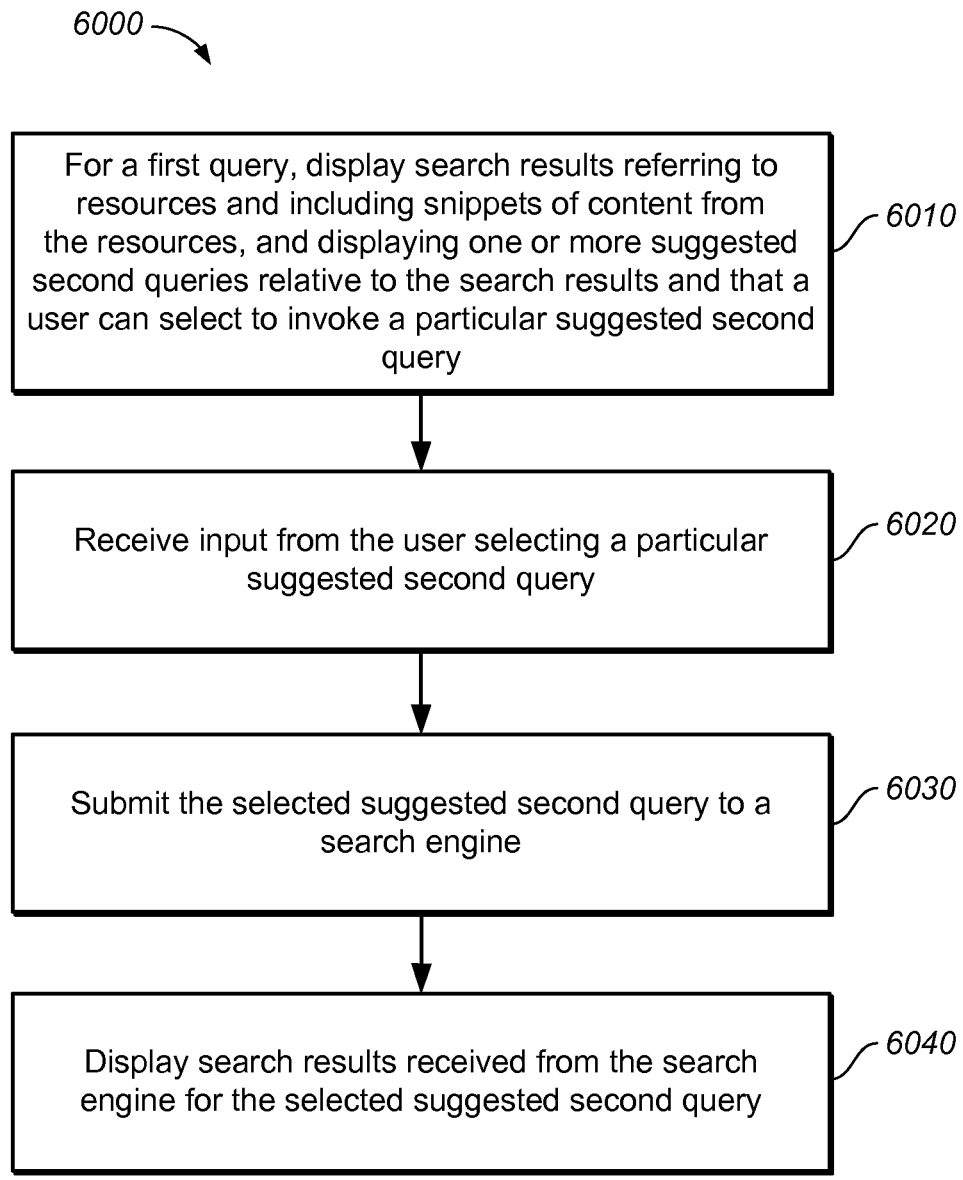
FIG. 6 shows an example process for invoking a suggested alternative query associated with displayed search results.

FIG. 6 shows an example process 6000 for invoking a suggested alternative query associated with displayed search results. For convenience, the example process 6000 will be described with reference to FIG. 5 and a system that performs the process 6000.

For a first query, the system displays a first set of one or more search results, where each search result refers to a respective resource and includes a link to the respective resource and a snippet of content from the respective resource, and displays one or more suggested second queries relative to the search results and that a user can select to invoke a particular suggested second query (step 6010). The system can display the first set of one or more search results on a display device of a client device 1004. The first query can be an original query submitted by a user, and the suggested second query can be a refined or alternative query.

In the example of FIG. 5, the web browser displays the web page 5000 including search results 5005 and one or more suggested alternative queries 5004 at a location on the web page 5000 relative to the search results 5005. The suggested alternative queries 5004 are positioned to the left of the search results 5005 and are selectable in order to invoke a search of the selected alternative query.

The system receives input from the user selecting a particular suggested second query (step 6020). For example, each of the suggested second queries can be represented by a link, which, when selected, provides the selected suggested second query as an input search query.

After the system receives input from the user selecting the suggested second query, the system submits to a search engine 1030 the suggested second query (step 6030). The search engine 1030 processes the suggested second query. The system displays a second set of one or more search results received from the search engine 1030 for the suggested second query (6040). The search engine 1030 returns the search results for the suggested second query as it would for any other query. That is, without explicitly entering a new query into a search text field of the web page 5000 of FIG. 5, a user can receive a set of search results for the suggested alternative query by simply selecting the suggested alternative query of the suggested alternative queries 5004.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    receiving a set of one or more search results for a first query, each search result referring to a respective resource and including a link to the respective resource and each search result including a snippet of content from the respective resource;
    receiving one or more suggested second queries, wherein each suggested second query is associated with the first query, wherein each suggested second query is generated by replacing a first sequence of terms in the first query with a second sequence of different terms, wherein one sequence is a substring of the other sequence, the second sequence of different terms having been determined based on aggregated statistics of follow-up queries that include the second sequence of different terms, the follow-up queries having been submitted by users after submitting the first query;
    for each of the one or more suggested second queries:
        selecting a set of one or more words in one of the snippets to represent the suggested second query;
        associating the suggested second query with the selected set of one or more words within the snippet, wherein a user interaction with the selected set of one or more words within the snippet invokes the suggested second query; and
        marking the selected set of one or more words within the snippet so as to provide a visual indicator that distinguishes the set of one or more words when the set of search results is displayed; and
    transmitting the set of search results including one or more snippets having one or more marked sets of one or more words associated with one or more of the suggested second queries to a client device for presentation to the user.

2. The method of claim 1, wherein the visual indicator further comprises:
    one or more of underlining, highlighting, italicizing, or displaying the set of one or more words in bold font.

3. The method of claim 1, where the multiple suggested second queries differ from the respective selected set of one or more words.

4. A computer program product, encoded on a non-transitory computer readable medium, operable to cause data processing apparatus to perform operations comprising:
    receiving a set of one or more search results for a first query, each search result referring to a respective resource and including a link to the respective resource and each search result including a snippet of content from the respective resource;
    receiving one or more suggested second queries, wherein each suggested second query is associated with the first query, wherein each suggested second query is generated by replacing a first sequence of terms in the first query with a second sequence of different terms, wherein one sequence is a substring of the other sequence, the second sequence of different terms having been determined based on aggregated statistics of follow-up queries that include the second sequence of different terms, the follow-up queries having been submitted by users after submitting the first query;

for each of the one or more suggested second queries:

selecting a set of one or more words in one of the snippets to represent the suggested second query;

associating the suggested second query with the selected set of one or more words within the snippet, wherein a user interaction with the selected set of one or more words within the snippet invokes the suggested second query; and marking the selected set of one or more words within the snippet so as to provide a visual indicator that distinguishes the set of one or more words when the set of search results are displayed; and transmitting the set of search results including one or more snippets having one or more marked sets of one or more words associated with one or more of the suggested second queries to a client device for presentation to the user.

5. The computer program product of claim 4, wherein the visual indicator further comprises:

one or more of underlining, highlighting, italicizing, or displaying the set of one or more words in bold font.

6. The computer program product of claim 4, where the multiple suggested second queries differ from the respective selected set of one or more words.

7. A system comprising:

a client device; and one or more computers operable to interact with the client device and to:

receive a set of one or more search results for a first query, each search result referring to a respective resource and including a link to the respective resource and each search result including a snippet of content from the respective resource;

receiving one or more suggested second queries, wherein each suggested second query is associated with the first query, wherein each suggested second query is generated by replacing a first sequence of terms in the first query with a second sequence of different terms, wherein one sequence is a substring of the other sequence, the second sequence of different terms having been determined based on aggregated statistics of follow-up queries that include the second sequence of different terms, the follow-up queries having been submitted by users after submitting the first query;

for each of the one or more suggested second queries:

select a set of one or more words in one of the snippets to represent the suggested second query;

associate the suggested second query with the selected set of one or more words within the snippet, wherein a user interaction with the selected set of one or more words within the snippet invokes the suggested second query; and mark the selected set of one or more words within the snippet so as to provide a visual indicator that distinguishes the set of one or more words when the set of search results are displayed; and transmit the set of search results including one or more snippets having one or more marked sets of one or more words associated with one or more of the suggested second queries to a client device for presentation to the user.

8. The system of claim 7, wherein the visual indicator further comprises:

one or more of underlining, highlighting, italicizing, or displaying the set of one or more words in bold font.

9. The system of claim 7, where the multiple suggested second queries differ from the respective selected set of one or more words.

10. The system of claim 7, wherein the one or more computers comprise a server operable to interact with the client device through a data communication network, and the client device is operable to interact with the server as a client.

11. The system of claim 10, wherein the client device comprises a personal computer running a web browser or a mobile telephone running a WAP browser.

12. The system of claim 7, wherein the one or more computers comprises one personal computer, and the personal computer comprises the client device.

* * * * *